No. 757,735. PATENTED APR. 19, 1904.
J. R. GEORGE.
SHAFT COUPLING.
APPLICATION FILED JULY 8, 1902.

NO MODEL.

Witnesses
Roy D. Tolman
Penelope Comberbach

Inventor
Jerome R. George.
By Rufus B. Fowler
Attorney

No. 757,735. Patented April 19, 1904.

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

SHAFT-COUPLING.

SPECIFICATION forming part of Letters Patent No. 757,735, dated April 19, 1904.

Application filed July 8, 1902. Serial No. 114,775. (No model.)

*To all whom it may concern:*

Be it known that I, JEROME R. GEORGE, a citizen of the United States, residing at Worcester, in the county of Worcester and Commonwealth of Massachusetts, have invented a new and useful Improvement in Shaft-Couplings, of which the following is a specification.

Figure 2:
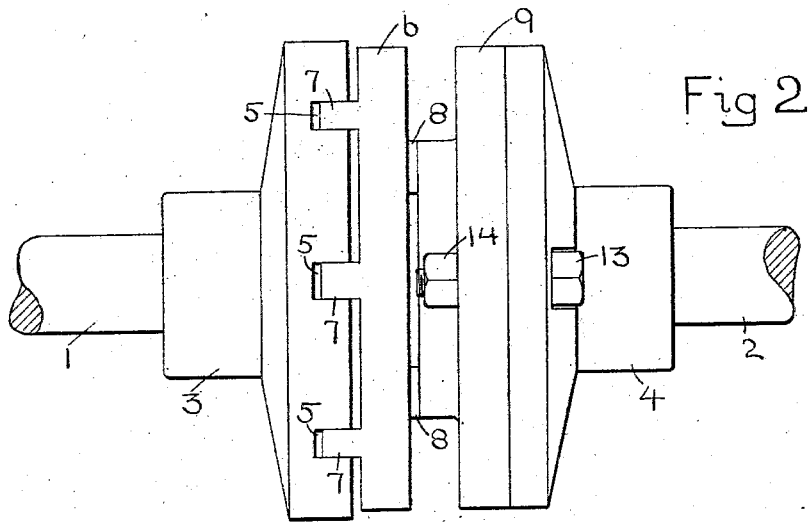
Figure 1:
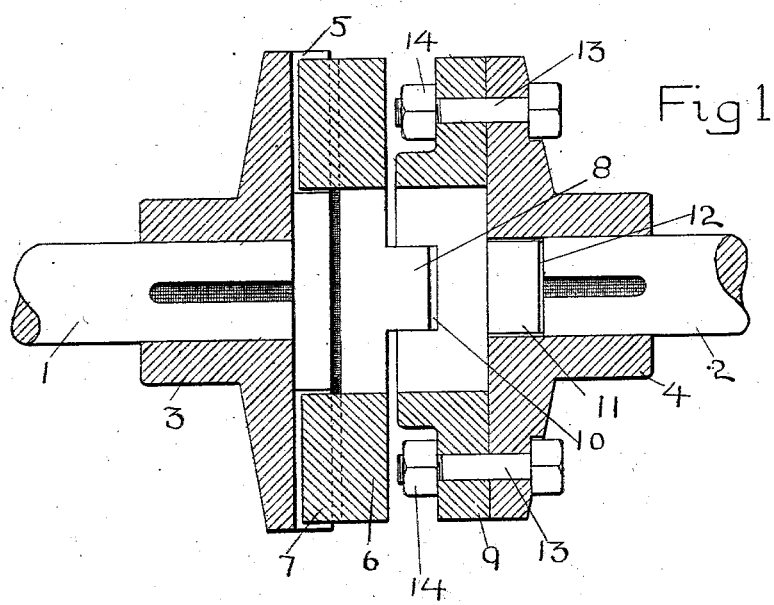

Figure 1 of the accompanying drawings is a longitudinal vertical section through the coupling, showing the ends of the two shafts in elevation; and Fig. 2 is a plan view of the coupling embodying my invention.

Similar reference-figures refer to similar parts in the different views.

The primary object of my invention is to afford means for coupling or uncoupling two shafts without the necessity of moving the shafts themselves, which would mean in many instances the dismantling of very heavy machinery, and another object is to provide a coupling which will connect the shafts operatively even though they are not in absolute alinement with each other.

With these objects in view my invention consists in a "filler," as it is termed, of such construction that it may be placed in position and attached to one of the shafts by first sliding it laterally and then securing it in place, in connection with a locking ring or disk which is interposed between the filler and the end of the other shaft and interlocked to each of said parts; and it further consists in other features of construction and combination of parts, which will be hereinafter described, and pointed out in the claims.

Referring to the accompanying drawings, 1 and 2 indicate the two shafts to be coupled together. On the inner ends of these shafts hubs or flanges 3 and 4 are keyed or otherwise secured, as shown in the drawings. These hubs or flanges are substantially similar in construction, their inner or adjacent faces being provided with one or more diametrically-disposed grooves 5 5. The hubs or flanges are so set upon the ends of the shafts that the groove or grooves in one of the hubs or flanges are at an angle, and preferably at right angles, to the groove or grooves in the other hub or flange.

The numeral 9 indicates a locking ring or disk which is provided with a rib or ribs 7 adapted to enter the groove or grooves 5 of the hub or flange 3, whereby the two are interlocked and rendered capable of sliding laterally. On the opposite side the locking ring or disk is provided with a tongue or tongues 8, which latter likewise extend diametrically at an angle, and preferably at right angles, to the rib or ribs 7.

The numeral 9 stands for the filler. This filler is diametrically grooved, as at 10, to receive the tongue 8 of the locking-ring, and parallel with this groove 10 and located on its opposite face is a projection or projections 11, which enter a corresponding groove or recess 12 in the face of the flange or hub 4. Bolts 13 13 secure the filler to the hub or flange 4, the nuts 14 14 being screwed thereon to retain the bolts in place.

To briefly explain the use and advantages of the coupling as I have devised it, it may be stated that by the addition of the filler, which element really constitutes the gist of my invention, it is possible to couple or uncouple the shafts to remove and replace a broken part of the coupling without in any wise changing or disturbing the position of the shafts, which shafts are so heavy and so connected with the engine and operative parts of the machinery that to move them even the slightest degree is a very difficult matter and practically impossible without taking the machinery apart at the expense of a great deal of time and trouble. By the use of this filler the difficulty referred to is entirely obviated, as it is simply necessary to unbolt the filler and slide it laterally from its seat in the direction of the groove 11 to remove it, after which the locking ring or disk 6 may be either slid laterally or moved endwise from its position, the removal of the filler allowing ample clearance for this purpose and the sides causing its release, as it will be observed that owing to the disposition of the groove or grooves 5 and rib or ribs 7 at an angle to the tongue 8 a lock is formed which would prevent the removal of the locking ring or disk while the filler is in position.

It is hardly necessary to state that in effecting a coupling after the shafts have been placed in position, with the hubs or flanges thereon placed a suitable distance from each other, the locking ring or disk is first placed in position and finally the filler is slid into place, interlocking with the ring or disk and hub or flange, to which it is afterward securely bolted. It will likewise be understood that the provision for interlocking the parts is of such a nature that the locking ring or disk adjusts itself or may be adjusted to any irregularity in exact alinement of the shafts, and this is provided for by the ability of the ring or disk to be moved radially with respect to the hub or flange 3 and of the ring or disk or the filler, as the case may be, to slide or be slid radially with respect to the other.

What I claim as my invention, and desire to secure by Letters Patent, is—

1. A shaft-coupling comprising hubs having flanges secured to the adjacent ends of the shafts and a locking ring or disk and filler interlocked with each other and interposed between and interlocked with one of said hubs, one of said interposed parts constructed and adapted to be secured to the adjacent hub, substantially as described.

2. A shaft-coupling comprising hubs having flanges secured to the adjacent ends of the shafts and a locking ring or disk and filler interlocked with each other and interposed between and interlocked with said hubs, one of said interposed parts constructed and adapted to be secured to the adjacent hub, substantially as described.

3. A shaft-coupling comprising hubs having flanges secured to the adjacent ends of the shafts to be coupled, a locking ring or disk interlocked and capable of radial adjustment with relation to one of said hubs and a filler interlocking with said ring or disk and adapted to be interposed between the ring or disk and the other hub by sliding the filler into position radially, substantially as described.

4. A shaft-coupling comprising hubs having flanges secured to the adjacent ends of the shafts to be coupled, a locking ring or disk interlocked and capable of radial adjustment with relation to one of said hubs and a filler interlocking with said ring or disk and adapted to be interposed between the ring or disk and the other hub by sliding the filler into position radially, and means for securing the filler to the adjacent hub, substantially as described.

5. In a shaft-coupling, the combination with hubs having flanges secured to the adjacent ends of the shafts to be coupled, of a locking ring or disk adjacent to one of said hubs, the adjacent faces of said hub and locking ring or disk being radially ribbed and grooved to interlock with each other, and a filler adapted to be interposed between said locking ring or disk and the other hub and secured to the latter, adjacent faces of said ring and filler having diametrical tongue-and-groove interlocking connection with each other disposed at an angle to the radial interlocking connection of the ring with its adjacent hub, substantially as described.

6. In a shaft-coupling, the combination with hubs having flanges secured to the adjacent ends of the shafts to be coupled, of a locking ring or disk adjacent to one of said hubs, the adjacent faces of said hub and locking ring or disk being radially ribbed and grooved to interlock with each other, and a filler adapted to be interposed between said locking ring or disk and the other hub and secured to the latter, adjacent faces of said ring and filler having diametrical tongue-and-groove interlocking connection with each other disposed at an angle to the radial interlocking connection of the ring with its adjacent hub, the filler having a diametrical tongue-and-groove interlocking connection with its adjacent hub extending parallel with the tongue-and-groove interlocking connection with the ring, substantially as described.

7. In a shaft-coupling, the combination with hubs having flanges secured to the adjacent ends of hubs, with said hubs diametrically grooved on their inner faces at an angle to each other, of a locking ring or disk having a diametrically-disposed rib on one face which fits and is capable of sliding in the groove of its adjacent hub, this ring or disk provided on its opposite face with a tongue disposed diametrically and at an angle to the rib on its opposite face, and a filler provided with a tongue on one side fitted to the groove of the other hub and provided on its opposite face with a groove disposed parallel with said tongue and adapted to receive the adjacent rib of the locking ring or disk, and means for securing the filler to its adjacent hub, substantially as described.

Dated this 2d day of July, 1902.

JEROME R. GEORGE.

Witnesses:
M. M. SCHUERMANN,
RUFUS B. FOWLER.